US012398763B2

(12) United States Patent
Contreras Sanchez (10) Patent No.: US 12,398,763 B2
(45) Date of Patent: Aug. 26, 2025

(54) MULTIPURPOSE PROTECTIVE CAP FOR TRANSMISSION DRIVE SHAFT ASSEMBLY

(71) Applicant: Nissan North America, Inc., Franklin, TN (US)

(72) Inventor: Alberto Contreras Sanchez, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 805 days.

(21) Appl. No.: 17/682,685

(22) Filed: Feb. 28, 2022

(65) Prior Publication Data

US 2023/0272824 A1     Aug. 31, 2023

(51) Int. Cl.
*F16D 3/84*     (2006.01)
*F16H 57/031*     (2012.01)
*F16J 13/12*     (2006.01)

(52) U.S. Cl.
CPC .......... *F16D 3/843* (2013.01); *F16H 57/031* (2013.01); *F16J 13/12* (2013.01); *Y10T 403/1608* (2015.01)

(58) Field of Classification Search
CPC ...... F16D 3/843; F16D 3/223; F16D 2300/12; F16H 57/031; F16H 57/00; F16H 2057/0056; F16H 2057/0062; F16H 2057/0093; F16J 13/12; F16J 15/3268; B25B 27/0028
See application file for complete search history.

(56) References Cited

U.S. PATENT DOCUMENTS

| | | | | |
|---|---|---|---|---|
| 1,271,077 A | * | 7/1918 | Probasco | F16J 9/14 277/499 |
| 1,398,439 A | * | 11/1921 | McMaster | F16J 9/14 277/497 |
| 4,218,813 A | * | 8/1980 | Cather, Jr. | B25B 27/0028 29/464 |
| 4,902,043 A | * | 2/1990 | Zillig | F16L 37/0987 285/379 |

(Continued)

FOREIGN PATENT DOCUMENTS

EP     1240980 A1 * 9/2002 ......... B25B 27/0028

OTHER PUBLICATIONS

Translation of EP 1240980 A1, obtained from FIT database (Year: 2002).*

*Primary Examiner* — Thomas C Diaz
(74) *Attorney, Agent, or Firm* — Young Basile Hanlon & MacFarlane, P.C.

(57) ABSTRACT

A multipurpose protective cap for a transmission prior to and during assembly with a drive shaft has a base portion having a cylindrical cross-section of a first inner diameter. The base portion comprises a side wall defining the cylindrical cross-section and having an outer edge and an inner edge, and a membrane spanning the cylindrical cross-section of the base portion at the outer edge of the side wall. An insertion portion extends from the base portion opposite the outer edge, the insertion portion having a cylindrical cross-section of a second inner diameter, the second inner diameter smaller than the first inner diameter. A contamination removal portion is formed in an interior surface of the insertion portion and configured to remove debris as the drive shaft passes through the insertion portion. A handle extends from the side wall of the base portion.

18 Claims, 6 Drawing Sheets

(56) References Cited

U.S. PATENT DOCUMENTS

| | | | |
|---|---|---|---|
| 6,632,999 B2* | 10/2003 | Sempliner | F16L 5/00 |
| | | | 52/27 |
| 2011/0179620 A1* | 7/2011 | Harmon | F16J 15/3268 |
| | | | 49/463 |

* cited by examiner

MULTIPURPOSE PROTECTIVE CAP FOR TRANSMISSION DRIVE SHAFT ASSEMBLY

TECHNICAL FIELD

This disclosure relates to a multipurpose protective cap used to protect the transmission prior to assembly with the drive shaft, protect the oil seal ring during insertion of the drive shaft and remove debris from the drive shaft during insertion into the transmission.

BACKGROUND

Currently, transmissions are stored and/or transported prior to assembly with a cap that seals the opening in the transmission configured to receive the drive shaft. The drive shaft is stored and/or transported with a cap on its stem to keep the stem free from dirt and debris. Prior to assembly, both caps are removed and an oil seal ring protector is positioned in the transmission opening configured to receive the drive shaft. The drive shaft is then inserted into the transmission opening and the oil seal ring protector is removed. Connection of the drive shaft to the transmission is then completed.

Because multiple protective devices are involved, there are multiple opportunities in the current process for a cap or protector to be forgotten or inadvertently removed prior to assembly. Even with the cap on the drive shaft stem, dirt and debris can still be introduced to the transmission via the drive shaft as the cap is not impervious to dirt and debris and dirt and debris can contaminate the shaft even if the cap is only removed for a short period of time.

SUMMARY

Disclosed herein are implementations of a multipurpose protective cap for a transmission prior to and during assembly with a drive shaft. The multipurpose protective cap is multi-functional, protecting the transmission prior to assembly with the drive shaft, protecting the oil seal ring during insertion of the drive shaft, and removing debris from the drive shaft during insertion into the transmission A multipurpose protective cap for a transmission prior to and during assembly with a drive shaft as disclosed herein has a base portion having a cylindrical cross-section of a first inner diameter. The base portion comprises a side wall defining the cylindrical cross-section and having an outer edge and an inner edge, and a membrane spanning the cylindrical cross-section of the base portion at the outer edge of the side wall. An insertion portion extends from the base portion opposite the outer edge, the insertion portion having a cylindrical cross-section of a second inner diameter, the second inner diameter smaller than the first inner diameter. A contamination removal portion is formed in an interior surface of the insertion portion and configured to remove debris as the drive shaft passes through the insertion portion. A handle extends from the side wall of the base portion.

Another implementation of a multipurpose protective cap is disclosed. The multipurpose protective cap is for a transmission prior to and during assembly with a drive shaft, the transmission having an opening for the drive shaft having an oil seal ring positioned around its inner circumference. The multipurpose protective cap comprises a base portion having a cylindrical cross-section of a first inner diameter, the first inner diameter being greater than an outer diameter of the oil seal ring. The base portion comprises a side wall defining the cylindrical cross-section and having an outer edge and an inner edge, and a membrane spanning the cylindrical cross-section of the base portion at the outer edge of the side wall. An insertion portion extends from the base portion proximate the inner edge, the insertion portion having a cylindrical cross-section of a second inner diameter, the second inner diameter smaller than the first inner diameter of the base portion. A contamination removal portion is formed in an interior surface of the insertion portion and configured to remove debris as the drive shaft passes through the insertion portion.

Other implementations are contemplated based on the description herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
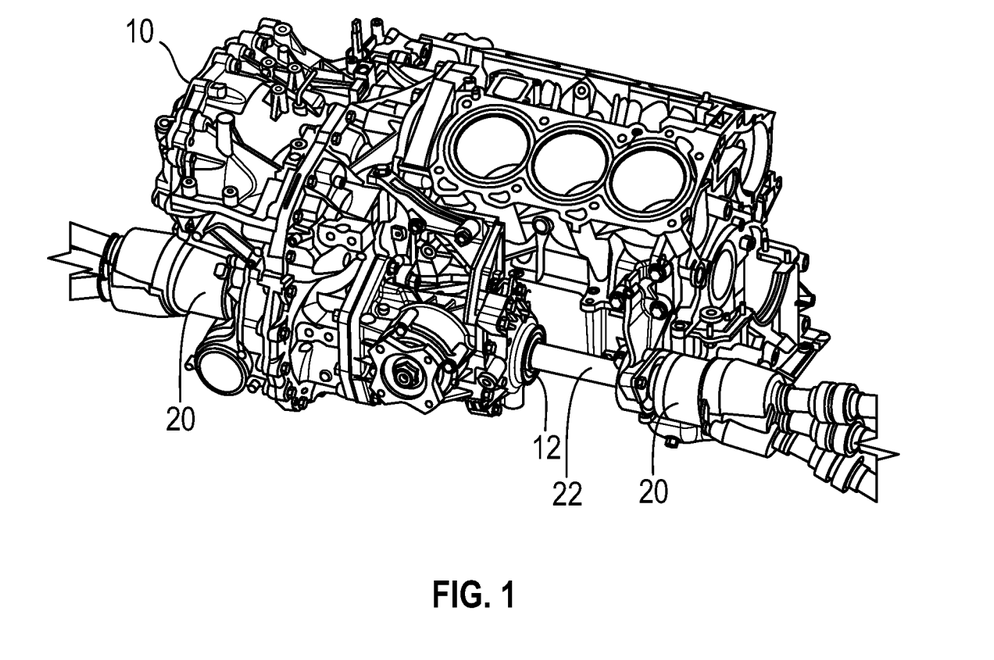
FIG. 1 is a schematic of a transmission coupled to a drive shaft.
Figure 2:
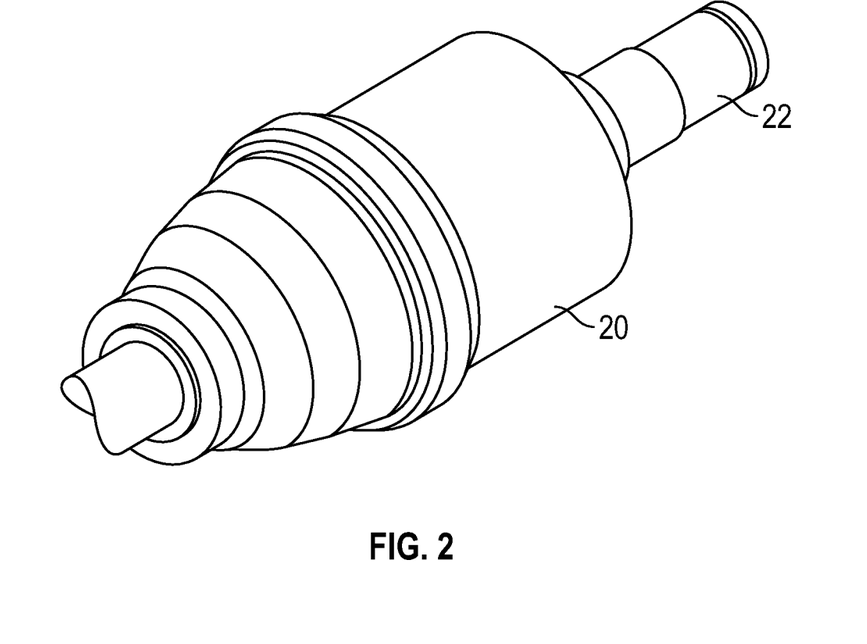
FIG. 2 is a schematic of at least a portion of a drive shaft.

FIG. 1 is a schematic of a transmission 10 connected to a drive shaft 20. As used herein, "transmission" can be any transmission that is connected to a drive shaft, including but not limited to a continuously variable transmission, a power transfer unit and a final drive unit, and can be used in any type of vehicle. Conventionally, transmissions are stored and/or transported prior to assembly with a cap that seals the opening 12 in the transmission 10 configured to receive the drive shaft 20. The drive shaft 20 is stored and/or transported with a cap on its stem 22 (shown in FIG. 2) to keep the stem 22 free from dirt and debris. Prior to assembly, both caps are removed and an oil seal ring protector is positioned in the transmission opening 12 configured to receive the drive shaft 20. The oil seal ring protector protects the oil seal ring from damage as the drive shaft 20 is inserted into the opening 12 of the transmission 10. The drive shaft 20 is inserted into the transmission opening 12 and the oil seal ring protector is removed. Connection of the drive shaft 20 to the transmission 10 is then completed, as illustrated in FIG. 1.

Because multiple protective devices are involved, there are many opportunities in the conventional process for one or more protective devices to be forgotten, inadvertently removed prior to assembly or improperly installed. Even with the protective cap on the stem 22 of the drive shaft 20 during storage and/or transportation, dirt and debris can still be introduced to the transmission 10 via the stem 22 of the drive shaft 20 as the protective cap is not impervious to dirt and debris and dirt and debris can contaminate the stem 22 even if the cap is only removed for a short period of time. There are also multiple locations in which the protective devices are used. For example, in a front-wheel drive vehicle, there are two entry points in the transmission in which the drive shafts (front left and front right) are inserted. In an all-wheel drive vehicle, there are four locations, one each for the front left and front right drive shafts and one each for the rear left and rear right drive shafts.

The multipurpose protective cap disclosed herein protects the transmission 10 during storage and/or transport and eliminates the need for the protective cap on the stem 22 of the drive shaft 20 as well as the oil seal ring protector. The multipurpose protective cap is designed to be inserted into the opening 12 of the transmission prior to storage and/or transportation and remain in the opening 12 until the drive shaft 20 is inserted into the opening 12. The multipurpose protective cap can be used in each opening within a transmission, with two being used in a front-wheel drive vehicle and four being used in an all-wheel drive vehicle.

Figure 3A:
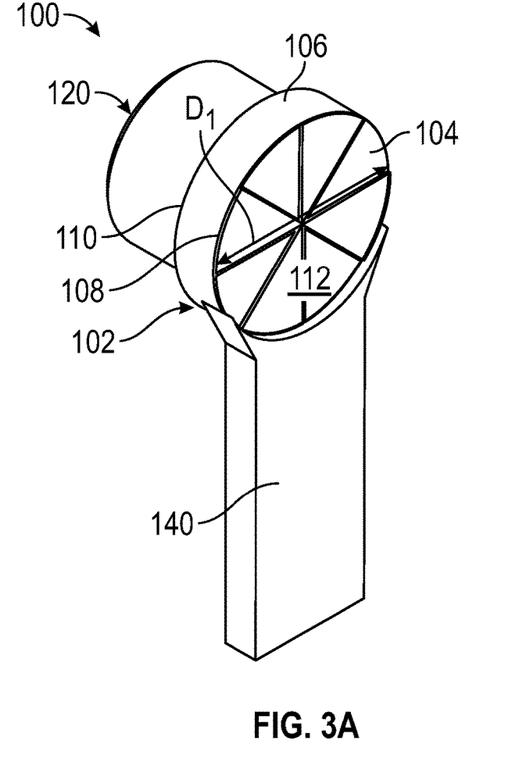
FIGS. 3A and 3B are perspective views of a multipurpose protective cap as disclosed herein.
Figure 3B:
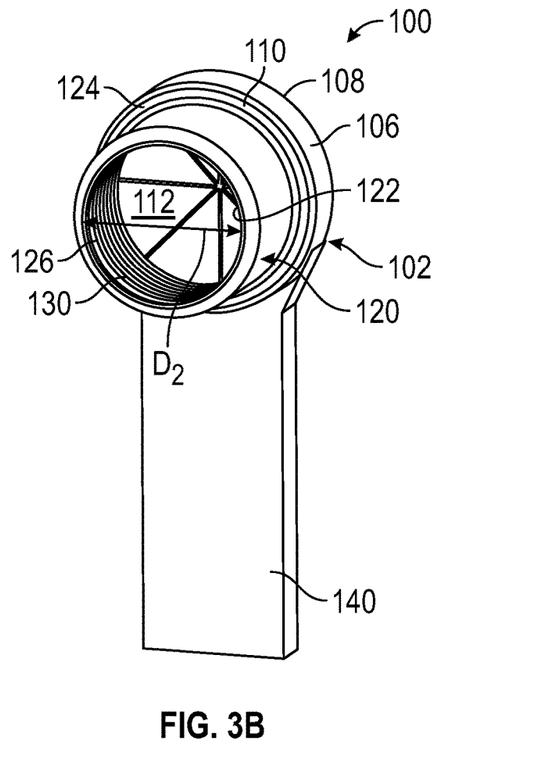

An implementation of a multipurpose protective cap 100 for a transmission 10 prior to and during assembly with a drive shaft 20 is shown in FIGS. 3A and 3B. The multipurpose protective cap 100 has a base portion 102 having a cylindrical cross-section 104 of a first inner diameter $D_1$. The cylindrical cross-section 104 is circular in this implementation. The base portion 102 comprises a side wall 106 defining the cylindrical cross-section 104 and having an outer edge 108 and an inner edge 110, and a membrane 112 spanning the cylindrical cross-section 104 of the base portion 102 at the outer edge 108 of the side wall 106. An insertion portion 120 extends from the base portion 102 opposite the outer edge 108, the insertion portion 120 having a cylindrical cross-section 122 of a second inner diameter $D_2$, the second inner diameter $D_2$ smaller than the first inner diameter $D_1$. The insertion portion 120 essentially extends from the inner edge 110 of the side wall 106 of the base portion 102, with a step 124 inward from the inner edge 110 to produce the smaller second inner diameter $D_2$. A contamination removal portion 130 is formed in an interior surface 126 of the insertion portion 120 and configured to remove debris as the drive shaft 20 passes through the insertion portion 120. A handle 140 extends from the side wall 106 of the base portion 102.

Figure 4A:
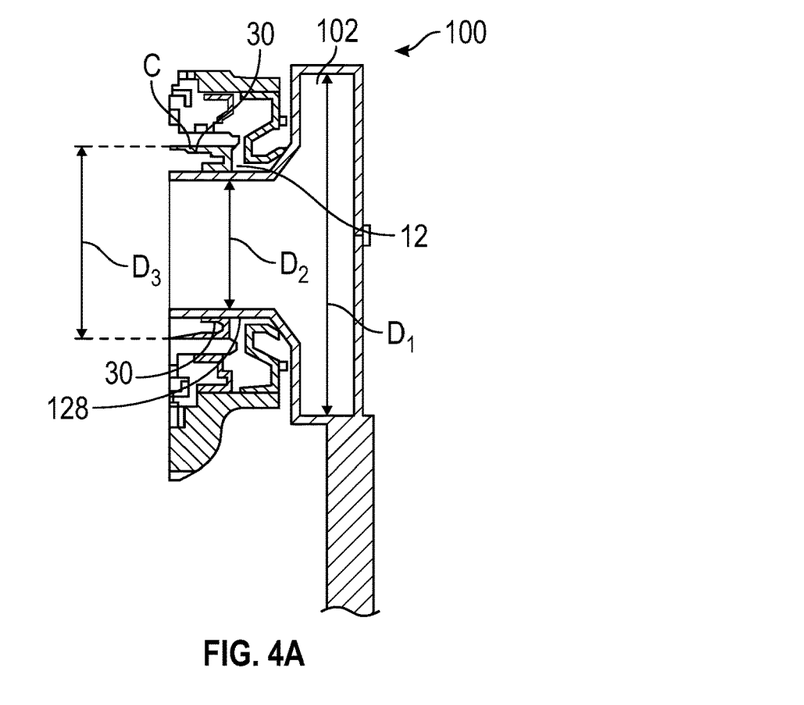
FIG. 4A is a cross-sectional view of the multipurpose protective cap disclosed herein inserted into an opening of the transmission.
Figure 4B:
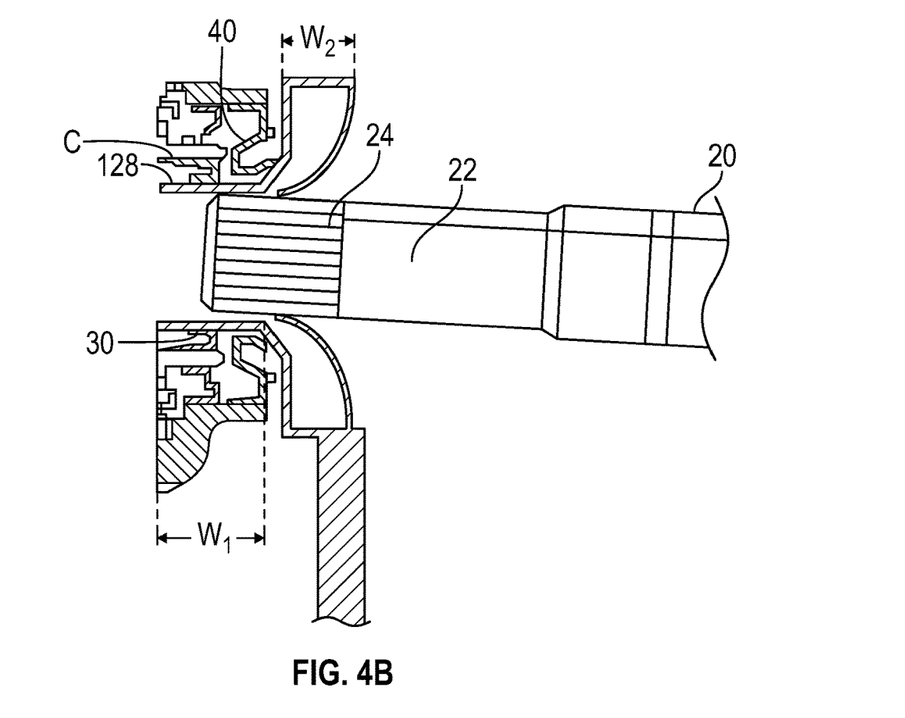
FIG. 4B is a cross-sectional view of the multipurpose protective cap inserted into the opening of the transmission as in FIG. 4A but with the drive shaft partially inserted.

As illustrated in FIGS. 4A and 4B, the opening 12 in the transmission 10 for the drive shaft 20 has an inner circumference C around which an oil seal ring 30 is positioned. The oil seal ring 30 is configured to sealingly engage the stem 22 of the drive shaft 20 to prevent oil leakage. The first inner diameter $D_1$ of the base portion 102 is greater than an outer diameter $D_3$ of the oil seal ring 30. In turn, the cylindrical cross-section 104 of the base portion 102 has a circumference that is greater than the circumference C of the opening 12 in the transmission 10. These dimensions of the base portion 102 protect the entire oil seal ring 30 from damage during insertion of the drive shaft 20 and also prevent any dirt and debris from entering the opening 12 of the transmission 10.

As illustrated in FIGS. 4A and 4B, the second inner diameter $D_2$ of the insertion portion 120 is sized to just receive the stem 22 of the drive shaft 20. When the insertion portion 120 of the multipurpose protective cap 100 is inserted into the opening 12 of the transmission 10, an outer surface 128 of the insertion portion 120 will contact the oil seal ring 30, the contact with the oil seal ring 30 biasing the oil seal ring 30 to accommodate the insertion portion 120. When the stem 22 is inserted and the multipurpose protective cap 100 removed, the oil seal ring 30 is unbiased enough to form a tight seal against the stem 22 of the drive shaft 20.

Figure 5:
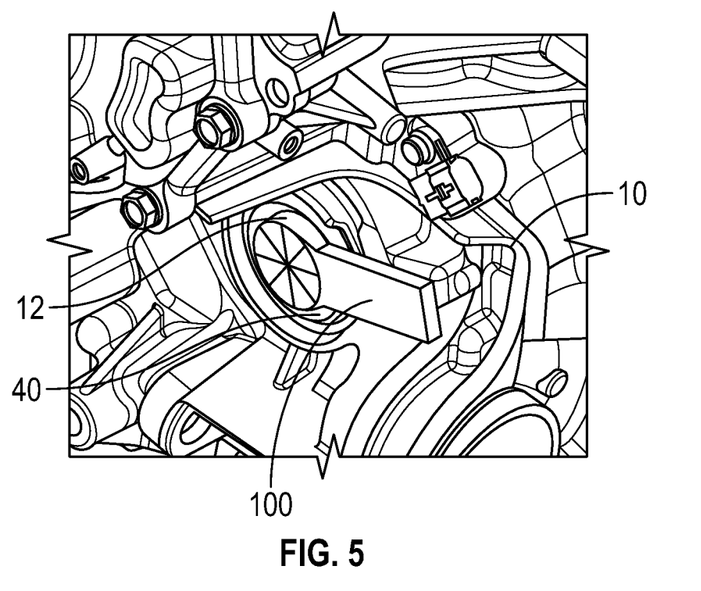
FIG. 5 is a schematic showing the multipurpose protective cap inserted into the opening of the transmission.

FIG. 5 shows the multipurpose protective cap 100 in place in the opening 12 of the transmission 10. In FIG. 5, an outer seal 40 can be seen, the outer seal configured to contact a wider portion of the drive shaft 20 when the drive shaft 20 is fully inserted. The multipurpose protective cap 100 can have a base portion 102 sized greater than the opening 12 but less than an outer circumference of the outer seal 40 as shown in FIG. 5 or can be sized greater than the opening 12 and greater than the outer circumference of the outer seal 40 as illustrated in FIGS. 4A and 4B.

Figure 6:
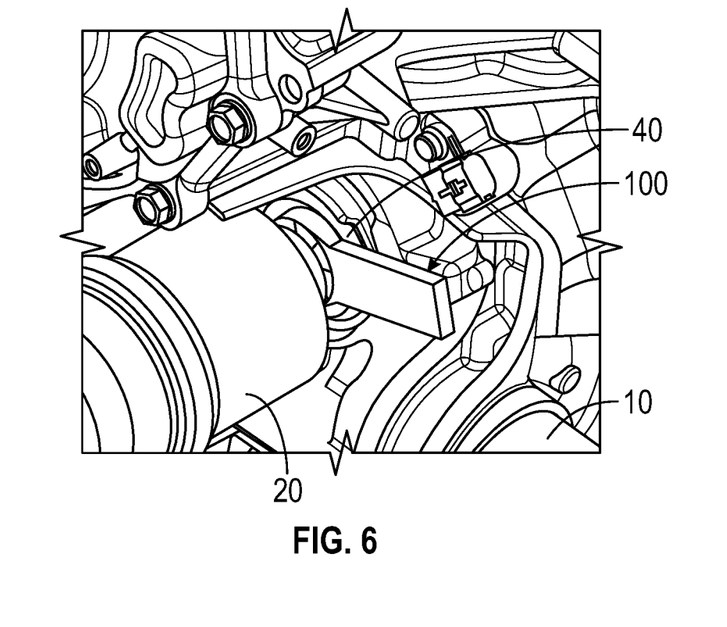
FIG. 6 is a schematic showing the multipurpose protective cap inserted into the opening of the transmission with the drive shaft inserted through a membrane of the multipurpose protective cap.
Figure 7:
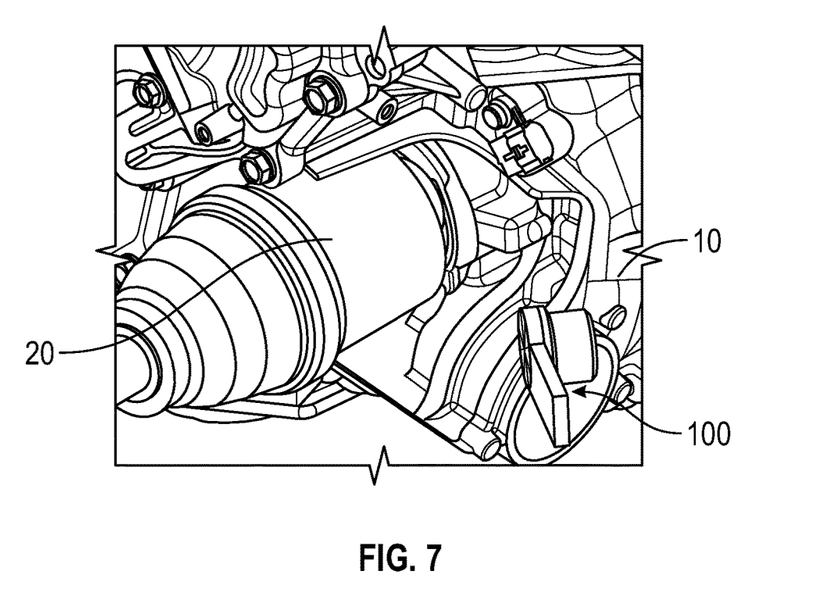
FIG. 7 is a schematic showing the multipurpose protective cap removed from the opening of the transmission after the drive shaft has been inserted.

FIG. 4B illustrates how the multipurpose protective cap 100 protects the oil seal ring 30 during insertion of the stem 22 of the drive shaft 20. FIG. 6 illustrates the drive shaft 20 inserted so that the stem 22 is past the oil seal ring 30. FIG. 7 illustrates the multipurpose protective cap 100 removed from the opening 12 of the transmission 10 and the drive shaft 20 fully inserted into the transmission 10.

Figure 8:
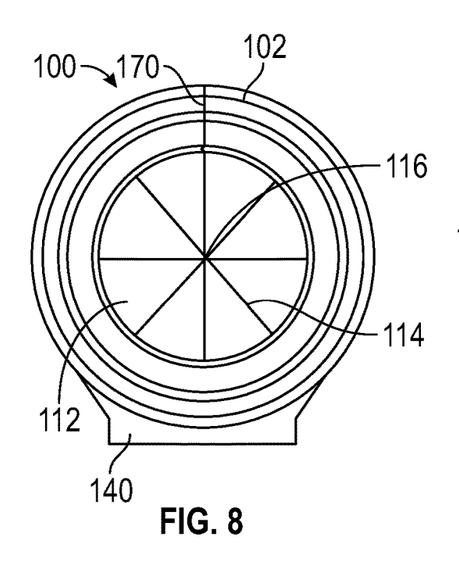
FIG. 8 is a plan view of the membrane of the multipurpose protective cap having weakened segments.
Figure 9:
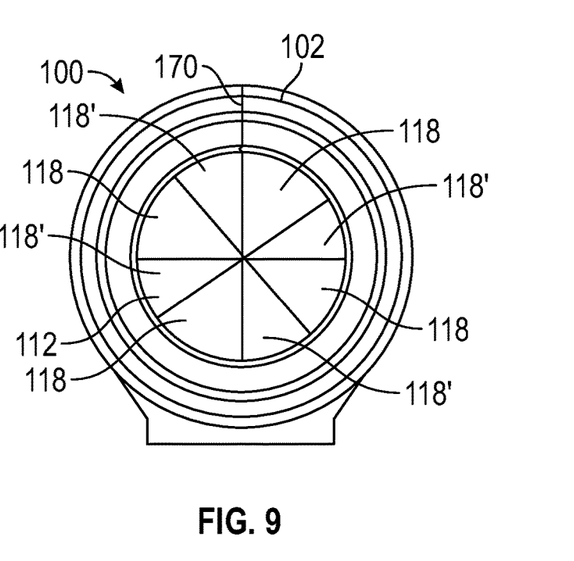
FIG. 9 is a plan view of the membrane of the multipurpose protective cap having alternating overlapping sections.

The membrane 112 across the cylindrical cross-section 104 of the base portion 102 can be a thin, flexible material configured to be punctured with a predetermined force applied to the membrane 112 when the stem 22 of the drive shaft 20 is pushed against it during insertion of the drive shaft 20. The membrane 112 can have weakened segments 114, illustrated in FIG. 8 radiating from a center point 116 of the membrane 112 to facilitate the rupture of the membrane 112 upon the application of the predetermined force. Alternatively, the membrane 112 can comprise overlapping sections of flexible material. As shown in FIG. 9, the overlapping sections can be the same size but, with the view in FIG. 9, alternating sections 118 appear larger from the viewing side because they overlap alternating sections 118', which appear smaller from the viewing side. The overlap serves to ensure no dirt and debris enter the transmission during storage and/or transportation, keeping the opening 12 of the transmission 10 sealed.

The width $W_1$ of the insertion portion 120 is greater than a width $W_2$ of the side wall 106 of the base portion 102 (shown in FIG. 4B). The width $W_1$ of the insertion portion 120 should be sufficient to completely cover the oil seal ring 30 and to provide sufficient surface area for the contamination removal portion 130. The width $W_2$ of the side wall 106 need only be wide enough to provide sufficient void space to allow for the membrane 112 to flex inwardly to either breaking point of the membrane or separation point of the membrane to allow for insertion of the drive shaft 20. This is schematically shown in FIG. 4B.

To ensure that the stem 22 of the drive shaft 20 does not introduce dirt and debris into the transmission 10, a contamination removal portion 130 is formed on the interior surface 126 of the insertion portion 120. The inclusion of the contamination removal portion 130 in the multipurpose protective cap 100 enables the elimination of the protective cap conventionally used on the stem 22 of the drive shaft 20 during storage/transportation.

Figure 10:
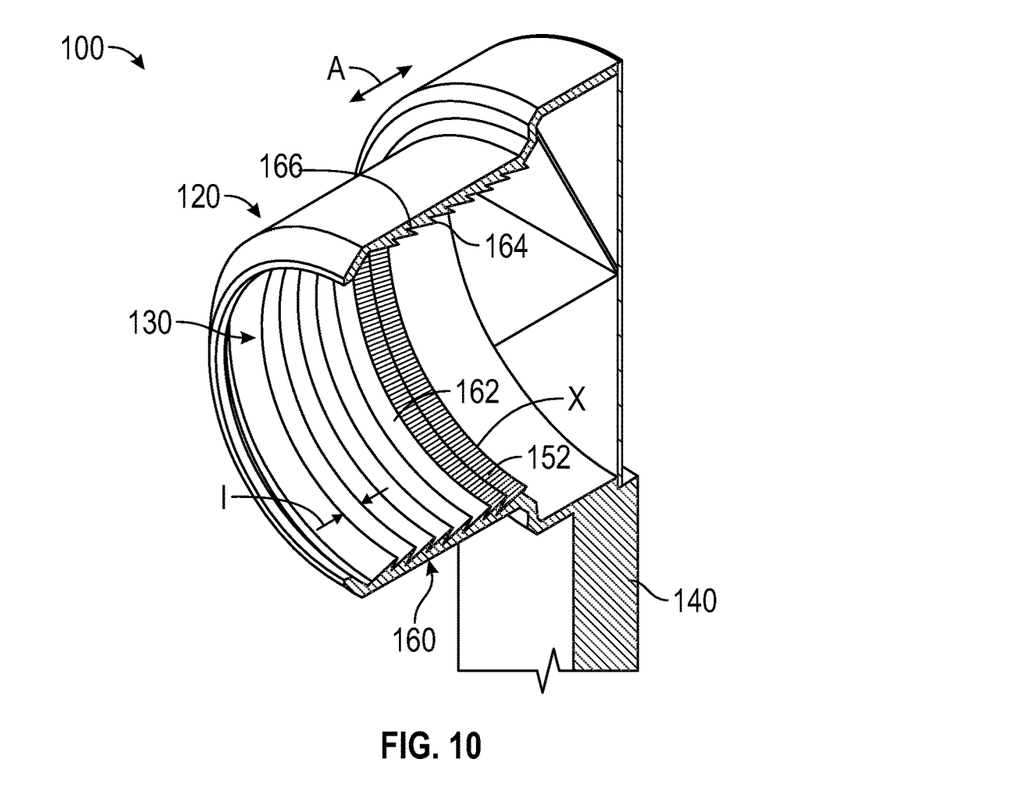
FIG. 10 is a cross-sectional view of the multipurpose protective cap showing the contamination removal portion.
Figure 11:
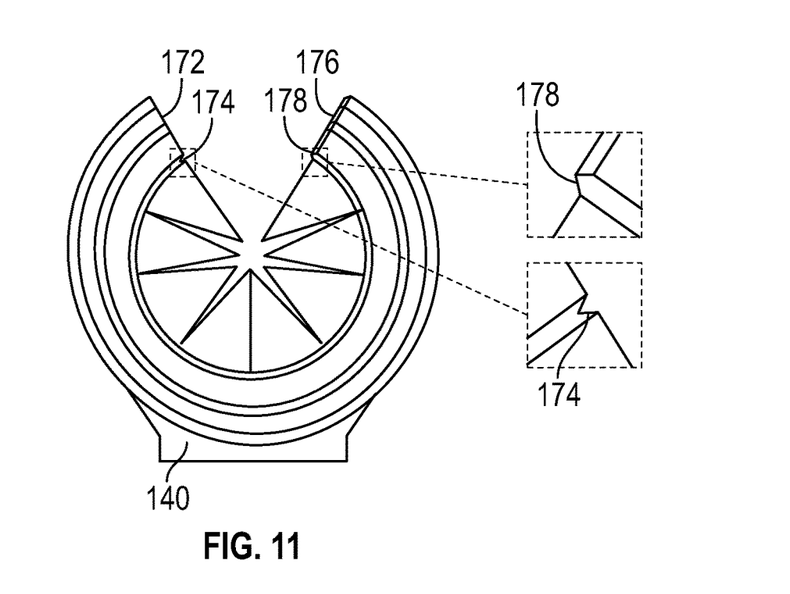
FIG. 11 is a schematic illustrating the split and the corresponding concave and convex V-shaped profiles of the split in the multipurpose protective cap.

FIG. 10 shows a cross-section of the multipurpose protective cap 100 to better illustrate the contamination removal portion 130. The contamination removal portion 130 can include one or both of a brush section 150 and a scraping section 160. The brush section 150 is configured to remove dirt and debris from within the longitudinal ridges on the end of the stem 22 of the drive shaft, the ridges 24 illustrated in FIG. 4B. The brush section 150 is positioned proximate or adjacent the inner edge 110 of the side wall 106 of the base portion 102. The brush section 150 has elongated ridges 152 extending parallel with an insertion direction A, the elongated ridges 152 formed in the interior surface 126 around an inner circumference X of the insertion portion 120. The elongated ridges 152 of the brush section 150 are sized to penetrate between ridges 24 of the stem 22, so that as the stem 22 is inserted into the opening 12, the elongated ridges 152 of the brush section 150 push out any dirt and debris between the ridges 24 of the stem 22.

The contamination removal portion 130 can include the scraping section 160 shown in FIG. 10. The scraping section 160, if used in conjunction with the brush section 150, is positioned adjacent the brush section 150 opposite the inner edge 110 of the side wall 106 of the base portion 102. The scraping section 160 is configured to scrape and collect dirt and debris during insertion from the stem 22 of the drive shaft 20 beyond the ridges 24. If used with the brush section 150, the scraping section 160 will collect the dirt and debris removed by the brush section 150, preventing contamination of the transmission 10. The scraping section 160 has an angled notch 162 formed in the interior surface 126 around the inner circumference X of the insertion portion 120. The angled notch 162 is configured so that the apex 164 of the angled notch 162 contacts the stem 22, scraping the stem 22 as it moves along the stem 22. Dirt and debris collects in the valley 166 of the angled notch 162. The scraping section 160 has one or more angled notches 162. FIG. 10 illustrates six angled notches 162 formed at intervals I along the width $W_1$ of the insertion portion 120 as a non-limiting example. The contamination removal portion 130 can extend the entire width $W_1$ of the insertion portion 120 or may only extend along a portion of the width $W_1$.

As illustrated in FIG. 7, when the drive shaft 20 is nearly completely inserted into the transmission 10, the multipurpose protective cap 100 is removed, and the drive shaft 20 is fully inserted into the transmission 10. To allow for removal of the multipurpose protective cap 100 after insertion of the drive shaft 20, a split 170 is formed along the base portion 102 and insertion portion 120 along the insertion direction A, as shown in FIGS. 8 and 9. The split 170 is shown formed along the base portion 102 and insertion portion 120 directly across from the handle 140. The split 170 is not limited to this location and can be in another location. The split 170 can be aligned with a weakened segment 114 of the membrane 112 or at an overlap between alternating sections 118, 118' of the membrane 112. One side 172 of the split 170 has a concave V-shaped profile 174 and another side 176 of the split 170 has a convex V-shaped profile 178 that is received in the concave V-shaped profile 174 when the split 170 is in a closed configuration. The snap fit of the concave and convex V-shaped profiles assist in keeping the split 170 in the closed configuration during storage/transportation and insertion of the drive shaft. Some pressure applied to the split 170 by pulling on the handle 140 separates the split 170 so that the multipurpose protective cap 100 can be removed from the opening 12 and from around the drive shaft 20 as illustrated in FIG. 7.

The handle 140 is configured to assist in removal of the multipurpose protective cap 100 after insertion of the drive shaft 20. The handle 140 can be of any shape and size that fits within the space allotted by the opening's position and configuration within the transmission. The handle 140 can be a short portion extending from the base portion 102 sufficient to grasp with a figure and thumb or can be a larger handle configured to grab with the entire hand.

The multipurpose protective cap 100 can be integrally molded from rubber, plastic or resin. The membrane 112 can be of the same material as the remainder of the multipurpose protective cap 100, but thinner to allow for the insertion of the drive shaft. Alternatively, the membrane 112 can be of a different material and fused with heat or welding, for example, to the base portion 102 of the multipurpose protective cap 100.

Unless defined otherwise, all technical and mechanical terms used herein have the same meanings as commonly understood by one of ordinary skill in the art to which this disclosure belongs. Structures described herein are to be understood also to refer to functional equivalents of such structures.

It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multipurpose protective cap for a transmission prior to and during assembly with a drive shaft, the multipurpose protective cap comprising:
    a base portion having a cylindrical cross-section of a first inner diameter, the base portion comprising:
        a side wall defining the cylindrical cross-section and having an outer edge and an inner edge; and
        a membrane spanning the cylindrical cross-section of the base portion at the outer edge of the side wall;
    an insertion portion extending from the base portion opposite the outer edge, the insertion portion having a cylindrical cross-section of a second inner diameter, the second inner diameter smaller than the first inner diameter;
    a contamination removal portion formed in an interior surface of the insertion portion and configured to remove debris as the drive shaft passes through the insertion portion, wherein the contamination removal portion comprises a brush section formed in the interior surface; and
    a handle extending from the side wall of the base portion.

2. The multipurpose protective cap of claim 1, wherein the membrane is a flexible material configured to be punctured with a predetermined force.

3. The multipurpose protective cap of claim 2, wherein the membrane comprises weakened segments radiating from a center point of the membrane.

4. The multipurpose protective cap of claim 1, wherein the membrane comprises overlapping sections of flexible material.

5. The multipurpose protective cap of claim 1, wherein the brush section has elongated ridges extending parallel with an insertion direction, the elongated ridges formed in the interior surface around an inner circumference of the insertion portion.

6. The multipurpose protective cap of claim 1, wherein the brush section is positioned adjacent the inner edge of the side wall of the base portion, the contamination removal portion further comprising a scraping section, the scraping section having an angled notch formed in the interior surface around an inner circumference of the insertion portion, the scraping section positioned adjacent the brush section opposite the inner edge of the side wall of the base portion.

7. The multipurpose protective cap of claim 6, wherein the scraping section comprises a plurality of angled notches formed in the interior surface, each of the plurality of the angled notches formed at intervals along an insertion direction.

8. The multipurpose protective cap of claim 1, wherein a width of the insertion portion is greater than a width of the side wall of the base portion.

9. The multipurpose protective cap of claim 1, further comprising:
   a split along an insertion direction of the multipurpose protective cap, wherein one side of the split has a concave V-shaped profile and another side of the split has a convex V-shaped profile that is received in the concave V-shaped profile when the split is in a closed configuration.

10. A multipurpose protective cap for a transmission prior to and during assembly with a drive shaft, the multipurpose protective cap comprising:
   a base portion having a cylindrical cross-section of a first inner diameter, the base portion comprising:
      a side wall defining the cylindrical cross-section and having an outer edge and an inner edge; and
      a membrane spanning the cylindrical cross-section of the base portion at the outer edge of the side wall;
   an insertion portion extending from the base portion proximate the inner edge, the insertion portion having a cylindrical cross-section of a second inner diameter, the second inner diameter smaller than the first inner diameter of the base portion; and
   a contamination removal portion formed in an interior surface of the insertion portion and configured to remove debris as the drive shaft passes through the insertion portion, the contamination removal portion comprising a scraping section having an angled notch formed in the interior surface around an inner circumference of the insertion portion.

11. The multipurpose protective cap of claim 10, wherein the membrane is a flexible material having weakened segments radiating from a center point of the membrane.

12. The multipurpose protective cap of claim 10, wherein the membrane comprises overlapping sections of flexible material.

13. The multipurpose protective cap of claim 10, wherein the contamination removal portion further comprises a brush section, the brush section having elongated ridges extending parallel with an insertion direction, the elongated ridges formed in the interior surface around an inner circumference of the insertion portion.

14. The multipurpose protective cap of claim 13, wherein the brush section is positioned adjacent the inner edge of the side wall of the base portion, the scraping section positioned adjacent the brush section opposite the inner edge of the side wall of the base portion.

15. The multipurpose protective cap of claim 10, wherein the scraping section comprises a plurality of angled notches formed in the interior surface, each of the plurality of the angled notches formed at intervals along an insertion direction.

16. The multipurpose protective cap of claim 10, wherein a width of the insertion portion is greater than a width of the side wall of the base portion.

17. The multipurpose protective cap of claim 10, further comprising:
   a split along an insertion direction of the multipurpose protective cap, wherein one side of the split has a concave V-shaped profile and another side of the split has a convex V-shaped profile that is received in the concave V-shaped profile when the split is in a closed configuration.

18. The multipurpose protective cap of claim 10 further comprising:
   a handle extending from the side wall of the base portion.

* * * * *